United States Patent [15] 3,691,382
Somer [45] Sept. 12, 1972

[54] LOW ENERGY PARTICLE COUNTER WITH ONE-DIMENSIONAL POSITION SENSING

[72] Inventor: Toivo A. Somer, Lake Orion, Mich.
[73] Assignee: The Bendix Corporation
[22] Filed: Oct. 30, 1970
[21] Appl. No.: 85,592

[52] U.S. Cl. ............250/83.3 R, 250/83 R, 250/207, 250/211 K
[51] Int. Cl. ...............................................G01t 1/16
[58] Field of Search ...250/83 R, 83.3 R, 715 R, 83 J, 250/207, 220 M, 203, 213 VT, 211 K, 41.9 D, 49.5 C; 356/206, 229; 313/103; 324/71 EB

[56] References Cited

UNITED STATES PATENTS 3,240,931  3/1966  Wiley et al. ............250/41.9 D

Primary Examiner—Archie R. Borchelt
Attorney—Plante, Hartz, Smith and Thompson

[57] ABSTRACT

The invention provides one-dimensional position information relating to the detection of low energy particles such as photons or charged particles and also provides the capability of counting the detected particles. A particle detection device of known type is combined with a linear resistor which splits the charge emanating from the detection device in a ratio which is proportional to the position of the charge on the linear resistor. An analog divider divides the proportional charge on the linear resistor into the output charge from the detection device to thereby yield an output indication which is independent of the statistically variable total charge emanating from the detection device. The output of the divider is, therefore, an indication of the position at which the charge emanated from the detection device, and also shows that a detected particle impacted the input end of the detector. Accordingly, the number of detectable charges which impinged upon the input end of the detector within a chosen period of time can be counted, and the positions at which they struck the detector can be recorded.

9 Claims, 1 Drawing Figure

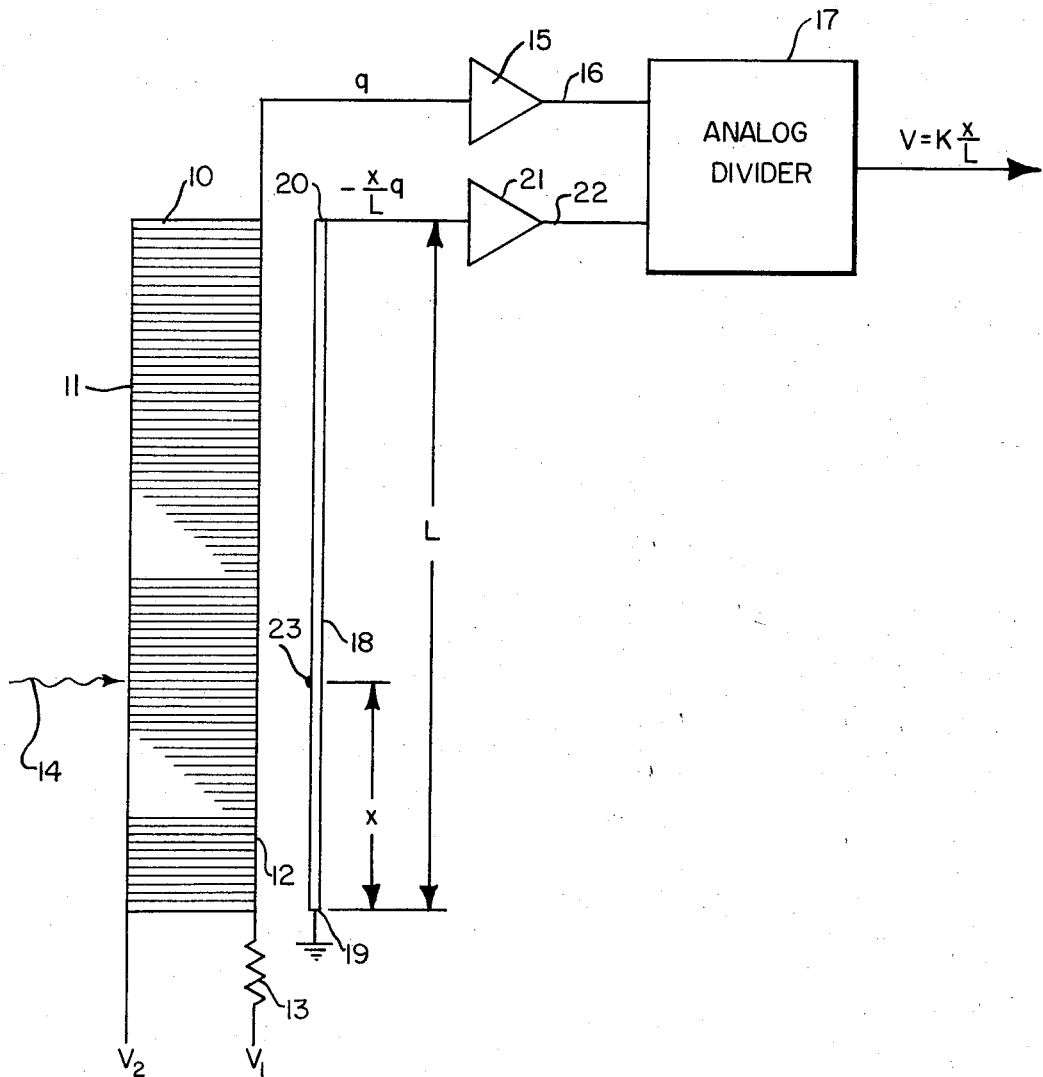

LOW ENERGY PARTICLE COUNTER WITH ONE-DIMENSIONAL POSITION SENSING

CROSS REFERENCE TO RELATED APPLICATIONS

This application is related to application, Ser. No. 85,593, filed Oct. 30, 1970, by Toivo A. Somer, entitled "Low Energy Particle Counter with Two-Dimensional Positioning Sensing," assigned to the assignee of the instant application.

BACKGROUND OF THE INVENTION

Devices for the detection of photons and charged particles which are presently available in the art can be divided into two categories. The first category includes devices which are useful in the detection of high energy radiation. In this type of device the radiation sensitive detection element includes a window which is relatively transparent to the radiation to be detected. Because the radiation is high energy, it passes through the window or material, although the passage through the window may attenuate the intensity of the radiation.

The second category of devices includes those which are capable of detecting low energy radiation. This type of device suffers a major disadvantage because the radiation energy is low, and therefore the attenuation of a window is significant and accordingly frequently prevents a useful detection of the energy. Accordingly, the prior art devices useful in detecting low energy radiation ordinarily do not include a window. Instead, the low energy radiation impinges directly upon the detection device, thereby eliminating the attenuation which would ordinarily be suffered because of the presence of the window. The invention is capable of detecting both high and low energy particles and therefore falls into either of these categories of radiation detection systems.

SUMMARY OF THE INVENTION

The invention is directed to a radiation detection device which yields an output which is indicative of the position at which the radiation struck the detection element and which is independent of the total charge emanating from the detection element.

The invention includes a radiation sensitive element, the output of which is a plurality of charged particles. The charged output particles are collected on the output end of the detection element. Therefore, the presence of a charge on the output end is indicative of the detection of a primary particle which impinged upon the input surface of the detection element. The output end of the detection element is connected to one input terminal of a two-input terminal analog divider so that a voltage proportional to the output charge serves as an input to the divider.

An anode, which is grounded at one end, is positioned in the proximity of the detection element so that the charges emanating from the detection element pass through the output end and impinge upon the anode. The ungrounded end of the anode is coupled to the input of a very low input impedance amplifier. Accordingly, the anode, in effect, is grounded at both ends. The anode is made from a linear resistance material, and therefore the charges striking the anode are diverted to the two ends of the anode in a proportion which is directly related to the ratio of the two resistances measured from the point of impingement of the charges and the two ends of the anode. Accordingly, the output from the low impedance amplifier is indicative of the ratio of the resistance values between the point of impingement of the charges and the two ends of the anode. For this reason, the output from the anode is hereinafter referred to as a position proportional signal.

The output of the amplifier is then directed as an input to the analog divider which divides the position proportional input by the total charge input to thereby eliminate the variable total charge factor from the divider output. Accordingly, the output of the analog divider is indicative of the position at which the charge impinged upon the linear resistance anode. Because the charged particles pass directly through the output end, the divider output is indicative of the position at which the input surface of the detective element was struck.

The total charge which constitutes the output of the detection devices varies because each detected particle produces an electron avalanche which is not a constant for all detected particles but varies from event to event about the "modal gain" with Gaussian distribution. The invention divides out the total charge and thus eliminates the variable.

The divider and amplifiers used in the system have minimal internal time delays, and therefore the system is capable of counting the number of impacts in a given time period and of locating the position of the impacts on the input surface of the device. As an example, two particles striking the input within a microsecond of one another can be distinguished and the location of the impacts recorded.

BRIEF DESCRIPTION OF THE DRAWING

The FIGURE is a preferred embodiment of the invention.

DETAILED DESCRIPTION

As shown in the FIGURE, the inventive system includes a particle detection element 10 which can be either a high energy detection element including a window or a windowless low energy detection element. As an example, the detection element 10 can be a spiraltron electron multiplier matrix.

A spiraltron electron multiplier is a windowless detector capable of detecting low energy particles. The matrix has an output pulse height distribution which is peaked and which has a well defined threshold for counting single detected particles. Such multipliers are made by spiraling the channel multipliers around a central core. Therefore, each of the multiplying channels has straight line geometry. This allows numerous multiplying channels to be stacked into large matrixes. Accordingly, spiraltrons can be fabricated to meet various size and operating power requirements and makes them particularly useful in the inventive system. Further details of a spiraltron electron multiplier can be found in an article entitled, "Spiraltron Matrixes as Windowless Photon Detectors for Soft X-Ray and Extreme U.V.," by T. A. Somer and P. W. Graves, which appeared in IEEE "Transactions in Nuclear Science," Volume NS—16, No. 1, February, 1969, at pages 376–380. The use of a spiraltron matrix as the energy sensitive element is presented as exemplary only, as other types of particle multiplying devices can be used in the inventive system.

The spiraltron matrix is connected to suitable voltages $V_1$ and $V_2$ to establish a potential drop across the matrix so that particles are accelerated across the matrix. The voltage $V_2$ is applied to the input end 11 of the spiraltron matrix, while the voltage $V_1$ is applied to an output end 12 of the matrix through a resistor 13. Consequently, the single particle radiation indicated by the arrow 14 which impinges upon the input surface 11 causes secondary emission of electrons within the matrix. These electrons are accelerated through the matrix by the potential drop established by the voltages $V_1$ and $V_2$, and are detected at the output end 12. The charge Q present on the output end 12 establishes a voltage which serves as an input to an amplifier 15. The output of the amplifier 15 is then directed to the first input terminal 16 of an analog divider 17. Accordingly, a voltage which is representative of the total charge Q emanating from the multiplier 10 is input to divider 17.

Although every charged particle which emanated from the multiplier 10 impinges upon output end 12, the charges do not come to rest on this surface. Instead, the charges pass through the output end 12 and impinge upon an anode 18 which is physically and electrically displaced from output end 12. The anode 18 is in the form of a linear resistor element which is grounded at one end 19 and which is connected to the input of the second amplifier 21 at the other end 20. The output of amplifier 21 is connected to the second input terminal 22 of the analog divider 17.

Amplifier 21 is a low input impedance amplifier having essentially zero input impedance. Accordingly, both ends 19 and 20 of linear resistive element 18 are essentially grounded. Because of the accelerating field which exists between matrix output end 12 and the resistive anode 18, the charge Q is collected on the resistive anode 18 at the same distance X from the grounded anode end 19 as the point of impingement 23 upon the input surface 11 of matrix 10. Because both ends of the resistive anode 18 are essentially grounded, the charge Q divides inversely with respect to the resistances X and L-X. The resistance values X and L-X represent the resistance values present between the point of impingement 23 of the charged particles upon the resistive element 18 and the ends 19 and 20 of the resistive element, respectively.

The fractional portion of the total charge impinging upon the resistive anode 18 which flows to the input of the amplifier 21 is equal to (X/L) Q. Consequently, a voltage proportional to this charge serves as a second input to analog divider 17. It should be noted that the gains of amplifiers 15 and 21 are essentially equal in order to preserve a meaningful equality of charge Q.

The two voltage inputs to the analog divider 17 are, therefore, representative of Q and (X/L) Q. Therefore, the analog divider 17 performs the operation $$\frac{\frac{X}{L} Q}{Q}$$

thereby eliminating the statistically variable Q and producing an output voltage pulse V which is equal to K (X/L). Obviously, K is a constant determined by the characteristics of the divider 17. The presence of the output pulse V from the analog divider 17 is therefore indicative of the impact of a particle upon the input surface 11 of matrix 10 and the pulse amplitude of the output pulse V is a direct measure of the impact position 23 of the particle upon the matrix 10. Obviously, by correlating the grounded end 19 of linear resistance anode 18 with the bottom edge of matrix 10 the positional information of divider 17 output is directly indicative of input position 23 at which the detected particle struck anode 18.

Divider 17 can be any of several known types. For example, the divider can convert each of the input voltages into a logarithm and then subtract the two logarithms and take the antilog of the difference to get the divided output of the divider.

The system is capable of accurately indicating the location on the input end of the detection device where a particle struck the device because the inventive system eliminates the statistical variable in the output charge. For this reason, two forms of information are obtained from the inventive system. The first is the position information. The second is a count of the number of impacts in a given time. This count is obtained simply by counting the number of output indications from the system in a particular period of time.

What is claimed is:

1. A one-dimensional position indicating and counting radiation detection system comprising:
   a radiation detection element for receiving the radiation to be detected and yielding an output charge in response to the radiation impinging upon said element;
   first charge collection means receiving said output charge, said charge collection means being coupled to a first input of a divider means, so that said divider receives an input proportional to said output charge;
   charge splitting means receiving said output charge, said charge splitting means splitting said output charge into a proportional charge indicative of the position at which said output charge strikes said splitting means, the output of said splitting means being coupled to a second input of said divider so that a voltage proportional to said proportional charge is input to said divider;
   said divider serving to divide said proportional charge voltage by said output charge voltage so that the output of said divider is indicative of the position at which said radiation impinged upon said detection element.

2. The system of claim 1 wherein said radiation detection element is an electron multiplier, said radiation is low energy and said divider is an analog divider.

3. The system of claim 1 wherein said charge splitting means is a linear resistive element, one end of said resistive element being grounded.

4. The system of claim 3 wherein said linear resistive element is coupled to said divider through an amplifier having substantially zero input impedance.

5. The system of claim 4 wherein said output charge Q striking said resistive element is split according to the proportion Q (X/L) where:

$X$ = the distance from said grounded end to the point at which said charge strikes said resistive element, and $L$ = the total length of said resistive element.

6. The system of claim 5 wherein said first charge collection means receives said charge Q from said detection element so that said first input of said divider receives an input Q and said second input of said divider receives an input Q (X/L).

7. The system of claim 6 wherein said divider performs the operation $$\frac{\frac{X}{L}Q}{Q}$$

so that the output of said divider is K (K/L) where K is a constant determined by the characteristics of said divider.

8. The system of claim 7 wherein said radiation detection element is a windowless electron multiplier capable of detecting low energy photons or charged particles.

9. The system of claim 8 wherein the voltage input to said first divider input is indicative of said output charge from said multiplier and the output of said divider is indicative of the position at which the detected energy impinged upon said multiplier so that said system yields information relative to the position said energy impacted with said electron multiplier;

and the total number of output indications in a given period of time is equal to the number of detectable particles impinging upon said detection element in said period of time.

* * * * *